United States Patent [19]
Davis et al.

[11] 4,140,363
[45] Feb. 20, 1979

[54] SCANNING SYSTEM WITH A GENEVA WHEEL

[75] Inventors: Donald A. Davis, Manhattan Beach; Donald E. Schrader, Culver City, both of Calif.

[73] Assignee: Hughes Aircraft Company, Culver City, Calif.

[21] Appl. No.: 831,724

[22] Filed: Sep. 9, 1977

[51] Int. Cl.² ............................................. G02B 27/17
[52] U.S. Cl. ..................................... 350/6.8; 250/236
[58] Field of Search ................... 350/6, 7, 16, 6.7–6.8, 350/6.9; 358/153, 199, 285; 58/125 C; 250/235, 236, 482, 316, 347; 340/146.1 D; 179/71 R

[56] References Cited
U.S. PATENT DOCUMENTS

| | | | |
|---|---|---|---|
| 2,040,421 | 5/1936 | Almquist | 58/125 C |
| 3,153,723 | 10/1964 | Weiss | 350/7 |
| 3,508,051 | 4/1970 | Nichols et al. | 250/482 |
| 3,632,871 | 1/1972 | Watkins | 350/7 |
| 4,043,632 | 8/1977 | Jeffery et al. | 350/6.8 |
| 4,047,793 | 9/1977 | Lang | 350/6.8 |

*Primary Examiner*—John K. Corbin
*Assistant Examiner*—B. Wm. de los Reyes
*Attorney, Agent, or Firm*—Martin E. Gerry; W. H. MacAllister; Gregory B. Wood

[57] ABSTRACT

Apparatus for searching a large field of view to detect a modulated optical signal source utilizing an optical detector having a field of view capability less than the total field of view sought to be searched. A constant drive motor is coupled to a geneva five slot single pin mechanism which is fixed to a drum rotably mounted to a housing. A detector and associated focusing optics are positioned at the bottom of the housing with a housing window positioned on one side of the housing. Five reflective surfaces are positioned around the circumference of the drum so that the geneva mechanism intermittently rotates the drum to sequentially position each reflective surface to reflect optical energy passing through the housing window to the detector apparatus. The reflective surfaces are positioned at the varying angles around the drum so that different segments of the total field of view sought to be searched are sequentially interrogated.

15 Claims, 8 Drawing Figures

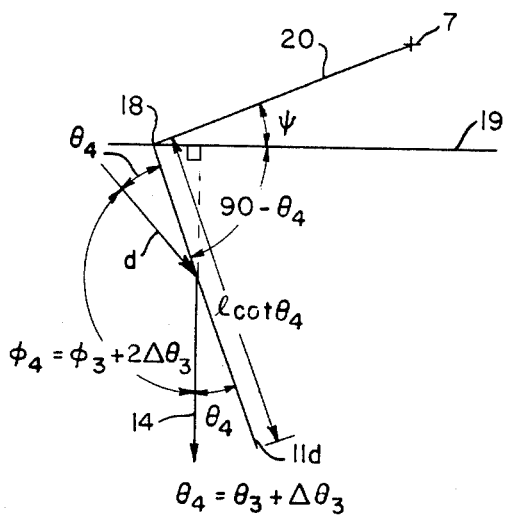
Fig. 4d.
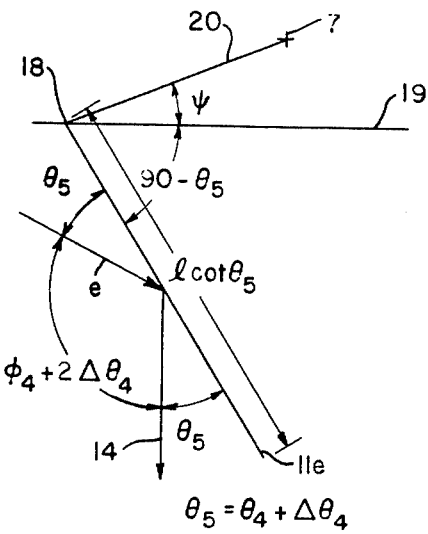
Fig. 4e.
Fig. 1.
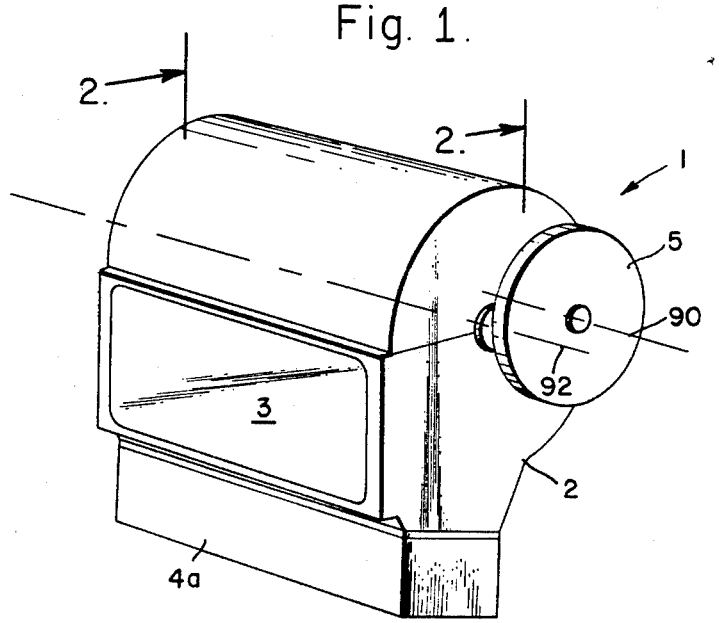

SCANNING SYSTEM WITH A GENEVA WHEEL

BACKGROUND OF THE INVENTION

1. Field of the Invention

The present invention relates to optical energy reception apparatus and more particularly to a mechanism for searching a large field of view to detect a modulated signal source utilizing a detector apparatus having a smaller field of view capability by sequentially stopping and looking at sub-regions of the total field of view.

2. Prior Art

Initially, it must be recognized that detection of a modulation source in a field of view requires that the detector mechanism utilized must continuously look or stare at the region from which the modulated signal source is emanating since modulation necessarily infers that the signal to be detected is time dependent. Several techniques may be utilized to stare at a particular region in space having a defined field of view to allow detection of a source of modulated optical energy. For example, a detector may be incorporated which has a field of view capability equal to the field of view sought to be looked at. Such a device will always stare at the same region of space and is acceptable when the field of view in either the azimuth or elevation direction is of limited size. However, as the field of view to be looked at becomes larger, either the size of the detector apparatus itself becomes large and expensive or the detector apparatus will have a decreased detection effectiveness and capability. Consequently, when effective detection in a large field of view is desired several detectors having a more limited field of view capability may be utilized to look at contiguous field of view regions and thus cover the entire field of view. Again, such a technique is expensive because of the amount of detector apparatus required if a large field of view is to be interrogated.

The present invention utilizes one or more detection devices to obtain the required field of view in one dimension (e.g. azimuth) but utilizes the same detectors to intermittently and sequentially look at limited portions of the total field of view in the second dimension (e.g. elevation) until the entire field of view in that second dimension has been observed. The "stare" time for each portion of the field of view intermittently looked at is chosen to be sufficient to allow detection of a modulated signal source in that region. Thus, the present invention provides a reduced cost, compact apparatus to detect modulation signal sources in an enlarged field of view.

SUMMARY OF THE INVENTION

In the present invention, a mounting structure, referred to hereafter as a drum, is rotably mounted to a housing apparatus which has a window region through which optical energy from the field of view sought to be observed may be received. Also mounted to the housing is a detector apparatus which in the preferred embodiment incorporates an IR detector region and the associated optical focusing apparatus. Fixed to the axle of the drum to cause the drum to rotate is a geneva slot gear having, for example, five slots equally spaced to have an angle of 72° between them. A drive motor, which may cause rotation to occur at a constant rate, is also provided to whose axle is connected a geneva pin mechanism positioned to periodically engage one slot in the geneva slot mechanism and thereby intermittently rotate the drum.

Around the circumference of the drum are five reflective surfaces oriented to be sequentially positioned for a fixed period of time to reflect optical energy passing through the window region to the detector apparatus. Each reflective surface around the circumference of the drum is positioned at a slightly different angle relative to the center line (optical axis) of the detector apparatus to thereby cause the detector apparatus to observe a different region of the total field of view each time a different reflective surface is positioned to reflect optical energy through the housing window.

The geneva mechanism utilized in the present invention allows a constant speed ac motor to be chosen thereby eliminating the brushwear problem existing in dc torque motors. Furthermore, the necessity of servo mechanisms and the associated and somewhat expensive electronics is eliminated. In addition, the geneva mechanism allows stop-start motion of the drum to be gradual, further increasing reliability since such motion eliminates the drive shock loads which exist in devices utilizing intermittent gearing to obtain this type of stop-start motion.

Another clear advantage of the present invention is that the various field-of-view sub-regions will always be looked at in the same sequence which assures that the period of time between re-interrogation of each field-of-view sub-region will be equal.

Thus, it is a general object of the present invention to provide apparatus for sequentially "staring" at each of a plurality of sub-regions of the total field of view in the dimension sought to be viewed.

Yet another object of the present invention is to provide apparatus wherein the period between reinterrogation of a particular sub-region of the field view is the same for all sub-regions of the field of view.

Still another object of the present invention is to provide a mechanism for detecting modulated signal sources in a large field of view utilizing a constant rotation ac torque motor.

Still another object of the present invention is to provide a signal search apparatus which requires only a minimum number of detectors to thereby reduce the amount of associated optics and signal processing channels required and consequently minimize system cost and complexity.

BRIEF DESCRIPTION OF THE DRAWINGS

A complete understanding of the present invention and the above and other objects and advantages thereof may be gained from a consideration of the following detailed description taken in conjunction with the accompanying drawings in which like reference numerals refer to like parts and in which:

FIG. 1 is a perspective pictorial view of one embodiment of the present invention.

FIG. 4a through 4e are diagrams illustrating the geometry of the respective reflective surfaces relative to the center optical path through the detector apparatus.

DETAILED DESCRIPTION OF THE DRAWINGS

Figure 2:
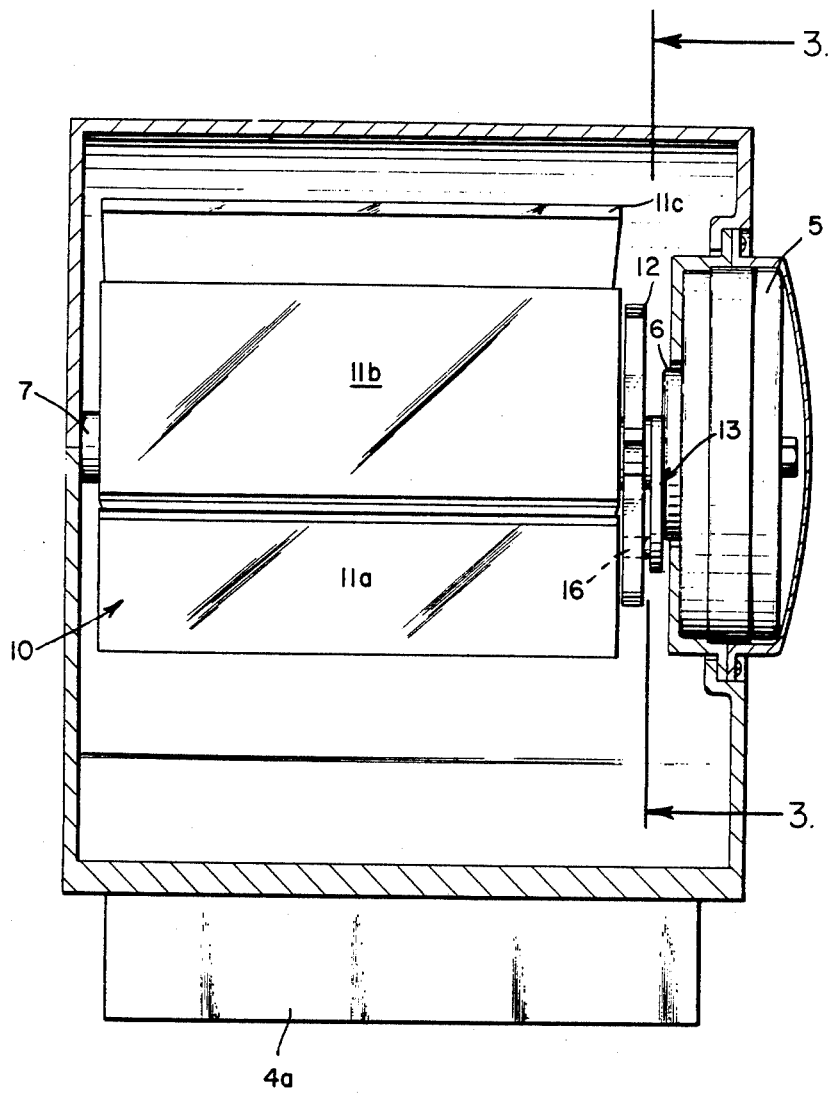
FIG. 2 is a front view of the preferred embodiment through Section 2—2 of FIG. 1.

Referring first to FIG. 1, there is shown a field of view scanner 1 in accordance with the present invention which comprises housing 2 having a housing window region 3. Coupled to housing 2 is detector housing 4a to receive optical energy passing through housing window region 3. Also coupled to housing 2 is constant rotation drive means 5 having an axis of rotation 90. A drum (not shown) is rotably mounted to housing 2 to rotate about axis 92.

Referring now to FIG. 2, a cut-away front view of the present invention through section 2—2 is shown having drum 10 rotably coupled to housing 2 by drum shaft 7. Placed on drum 10 are a plurality of reflective surfaces 11a, 11b, and 11c which are mounted on drum 10 at different slant angles to each reflect light to detector means (not shown) in detector housing 4a from a different portion of the field of view. Intermittent rotational movement of drum 10 is provided by a geneva slot mechanism 12 which is fixed to drum shaft 7, and geneva pin assembly 13 which is fixed to motor shaft busing 6 to rotate about the motor shaft.

Figure 3:
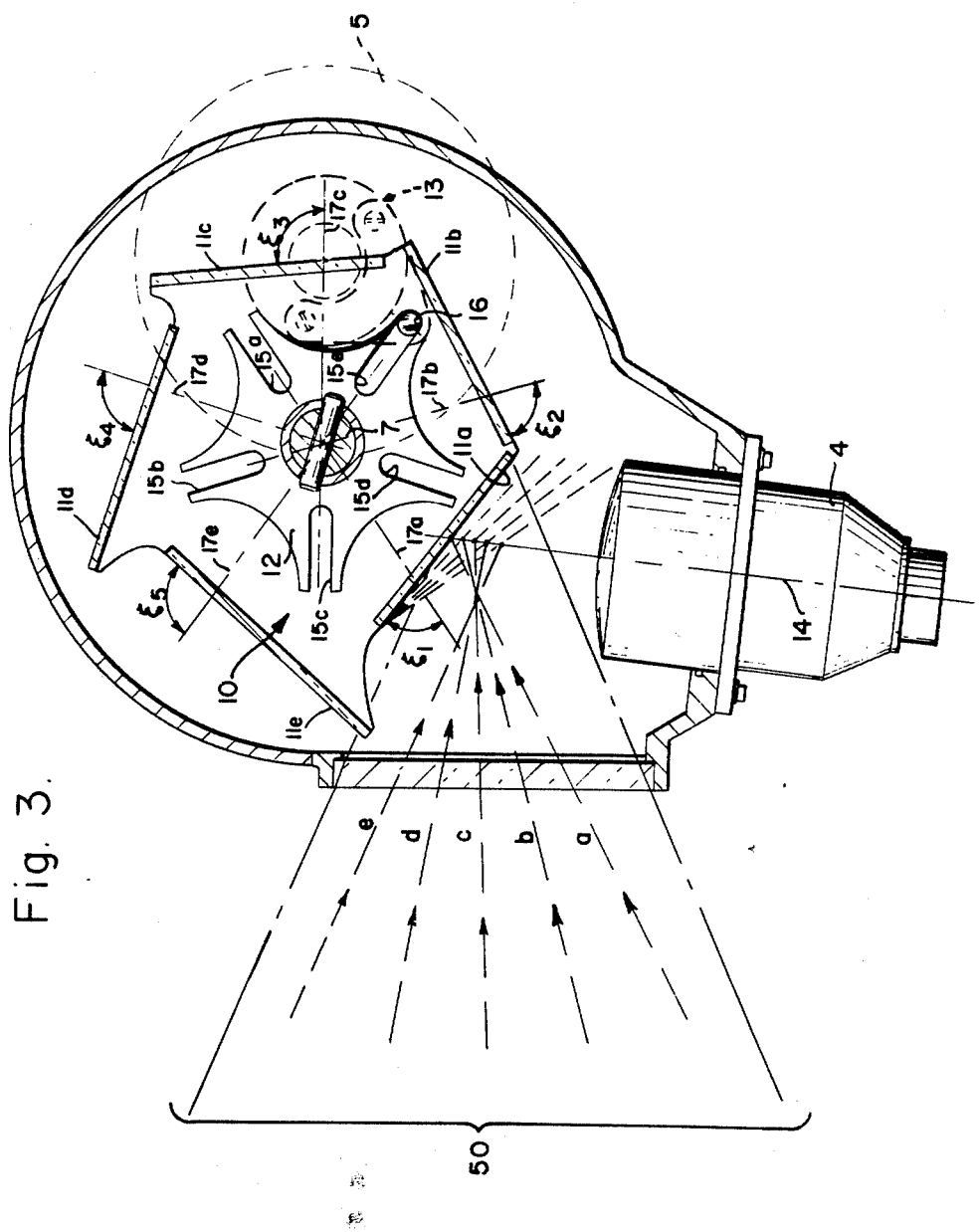
FIG. 3 is a side view of the preferred embodiment of the present invention through Section 3—3 of FIG. 2.

Referring now to FIG. 3, a cross-section of field of view scanner 1 through Section 3—3 in FIG. 2 is shown in which geneva slot gear 12 fixed to axle 7 incorporates five slots 15a–15e which are sequentially engaged by single geneva pin 16 which is fixed as a part of geneva pin assembly 13 to the motor shaft. In the illustrative example, the geneva slot-pin assembly is a five slot single-pin type. However, it will be appreciated that any number of slots and pins may be utilized which will impart the required intermittent rotational motion to drum 10. It will also be appreciated that the total number of reflective surfaces 11 mounted on drum 10 can be no greater than the total number of slots but may be less if a more limited field of view scan sequence is desired.

As previously mentioned, the intermittent rotate-stop motion of drum 10 imparted by the geneva mechanism is necessary to allow any particular reflective surface 11 to persist in one location to allow detector means 4 to look for and detect any modulated signal source in the limited field of view which is being looked at. It should be emphasized that no detection or scanning occurs while drum 10 is being rotated and that all detection by detector means 4 occurs while one of the reflective surfaces 11 is in a fixed position above detector means 4 to reflect light from the environment into detector means 4. It will be further appreciated that detector means 4 not only includes an actual detector arrangement such as an IR detector, but also includes the focusing apparatus necessary for the optical processing of collimated light. In addition, it will be appreciated that while preferable, an electronic detector is not essential to practice the present invention. For example, an observer may be positioned to receive reflected light at a fixed observation point.

Since one object of the present invention is to detect a modulated signal source in a wide field of view 50 utilizing a detector means having a narrow field of view, the various reflective surfaces 11 placed on the circumference of drum 10 are positioned at different slant angles so that each time a reflective surface is positioned above detector means 4 a different portion of the total field of view sought to be interrogated is selected. For example, in FIG. 3 reflective surface 11a, when positioned above detector means 4 which has a field of view of approximately 10° about centerline 14, will cause optical energy in a field of view 5° either side of ray a to be reflected into detector means 4 and detected. Similarly when drum 10 is rotated to cause reflective surface 11b to be positioned above detector means 4, optical energy occurring in a field of view 5° either side of ray b will be reflected from reflective surface 11b into detector means 4. The same process occurs as drum 10 is rotated to position reflective surfaces 11c, 11d and 11e sequentially above detector means 4 to thereby detect optical energy in a five degree field of view on either side of rays c, d, and e respectively. While in the embodiment shown, the fields-of-view about rays a, b, c, d and e are sequentially interrogated, it will be appreciated that any sequence may be implemented simply by rearranging the defined slant angles at different positions on the circumference of drum 10.

It should be noted that one significant advantage of the present drum mechanism is that the period of time between repetitive interrogation of corresponding segments of the total field of view is equal. This is unlike bidirectional scanning or interrogation schemes which would look at the field of view about ray a then look at a field of view about ray b, etc., until the field of view about ray e was interrogated at which time the field of view about ray e would again be immediately interrogated with the field of view about ray a being the last to be interrogated. Thus, the amount of time before reinterrogation of the end segment of the field of view would be doubled in some prior art circumstances.

Referring now to FIGS. 4a–4e, the angular arrangement of reflective surfaces 11a–11e about the circumference of drum 10 in relation to detector means center line 14 and the particular field of view sought to be interrogated is shown. It will be appreciated that while the field of view indicated is in one dimension, detector means 4 has a limited field of view in the perpendicular dimension so that for example, if detector means 4 had a field of view of 10° in azimuth and 10° in elevation and it is desired to interrogate an elevation field of view of 50°, then the present invention would be oriented to scan in elevation. If additional field-of-view requirements in azimuth were necessary and it was still desired to interrogate in elevation, then additional detector means 4 could be placed adjacent to one another to scan adjacent 10° segments in azimuth. Of course, scanning could also occur in azimuth rather than elevation in accordance with the present invention or the present invention could be used to interrogate in both azimuth and elevation by gimbaling the drum housing to rotate in azimuth utilizing a second geneva mechanism, for example.

Referring back to FIG. 3, since the geneva slot gear is in a fixed position relative to the drum, the particular orientation of each reflective surface may be related to a particular line segment 17 which passes through the center point of a particular slot, intersects the center of drum axle 7, and passes through the oppositely positioned reflective surface. For example, segment 17a passes through the center of slot 15a and intersects the center of axle 7 passing through reflective surface 11a to define the angle $\xi_1$. The position of slot 15a relative to the center of drum axle 7 and mirrored surface 11a is arbitrary so long as that relative position is fixed and remains constant at all times and further that any such relation between the geneva slot mechanism 12 and the drum 10 is such that the reflective surfaces 11a–11e will be properly positioned above detector means 4 to reflect optical energy from a particular small region of the total field of view sought to be interrogated.

Although the initial positioning of a slot and an oppositely positioned reflective surface is arbitrary, each of the other reflective surfaces has a definite orientation relative to the orientation of the first reflective surface on the circumference of drum 10. Thus, if segment 17a intersects reflective surface 11a at an angle $\xi_1$ then segment 17b passing through the center of slot 15b and intersecting the center drum 7 forms an angle $\xi_2$ with reflective surface 11b where $\xi_2 = \xi_1 + \Delta\theta_1$.

Similarly segment 17c passing through the center of slot 15c and intersecting the center of drum 7 forms an angle $\xi_3$ with surface 11c where $\xi_3 = \xi_2 + \Delta\theta_2$. Continuing, $\xi_4$ represents the angle between reflective surface 11d and segment 17d where $\xi_4 = \xi_3 + \Delta\theta_3$. Finally, segment 17e intersects reflective surface 11e at an angle $\xi_5$ where $\xi_5 = \xi_4 + \Delta\theta_4$.

If the field of view selected to be interrogated requires the periodic interrogation of ten degree fields-of-view about rays a, b, c, d and e, then reflective surface 11a must be positioned at an angle $\theta_1$ relative to the center line 14 of detector means 4. Similarly, reflective region 11b must be positioned at an angle $\theta_2$ relative to center line 14 in order for optical energy about ray b to be interrogated. Continuing, reflective surface 11c must be positioned at an angle $\theta_3$ relative to center line 14, reflective surface 11d must be placed at an angle $\theta_4$ and reflective surface 11e must be placed in an angle $\theta_5$ relative to center line 14 to reflect optical energy about respective rays c, d and e, into detector means 4.

It will be appreciated of course, that optical energy along rays a, b, c, d and e is essentially collimated and is reflected from the respective reflected surfaces 11a–11e in a column substantially parallel to center line 14 of detector means 4. Detector means 4 then focuses the substantially collimated optical energy reflected from the respective reflected surfaces onto the detector surface.

Figure 4A:
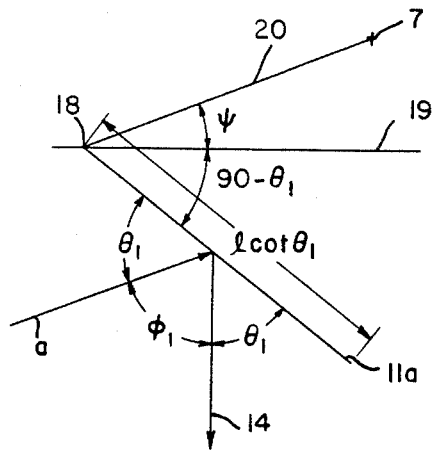

Referring again to FIGS. 4a–4e, the geometry of the reflective surface positioning may be explained in greater detail. In FIG. 4a, reflective surface 11a forms an angle $\theta_1$ with optical path (detection centerline) 14. Incoming ray a also forms an angle $\theta_1$ with reflective surface 11a. Each of the reflective surfaces 11a–11e have a common imaginary pivot point 18 when positioned to reflect light along optical path 14. A segment 19 which is positioned to pass through pivot point 18 perpendicular to the extension of optical path 14 as shown, is the same for each reflective surface position. A segment 20 intersects drum axle 7 and passes through pivot point 18. The angle $\psi$ between segment 20 and segment 19 remains constant but may be an arbitrary angle chosen to optimize the packaging and size of the present invention. Referring again to FIG. 4a, the angle between segment 19 and reflective surface 11a is thus $90°-\theta_1$.

Figure 4B:
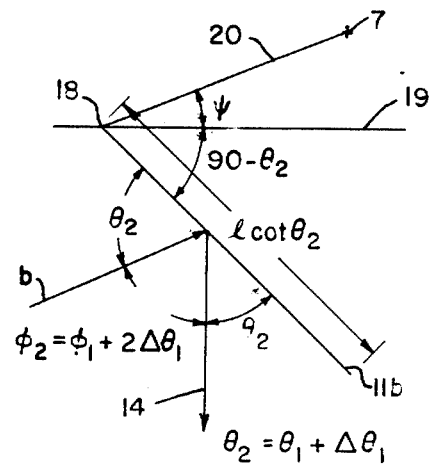

Referring now to FIG. 4b, reflective surface 11b is positioned at an angle $\theta_2$ relative to optical path 14 and ray b, with the angle between segment 19 and reflective surface 11b being $90°-\theta_2$. $\theta_2$ is related to $\theta_1$ by the equation $\theta_2 = \theta_1 + \Delta\theta_1$ where $\Delta\theta_1$ is equal to $\frac{1}{2}$ of the field of view detector means 4. It will be appreciated, of course, that $\Delta\theta_1$ may be any angle if sub-optimal operation is acceptable. For example, if $\theta_1$ is less than $\frac{1}{2}$ of the field view of detector means 4 then the interrogated region about ray b will overlap the interrogated region about ray a. On the other hand, if $\Delta\theta_1$ is larger than $\frac{1}{2}$ of the field of view of detector means 4 then a region between the interrogated field of view about ray a and an interrogated field of view about ray b will not be seen by detector means 4. It will also be noted that according to geometric principles, it is necessary to set $\Delta\theta_2$ to be only $\frac{1}{2}$ of the field of view of detector means 4 to allow detector means 4 to observe the next contiguous field of view region equal to the detector means field of view. In other words, if the angle between optical path 14 and ray a in FIG. 4a is defined as $\phi_1 = 180° - 2\Delta\theta_1$ then the angle between optical path 14 and ray b in FIG. 4b will be $\phi_2 = \phi_1 + 2\Delta\theta_1$.

Figure 4C:
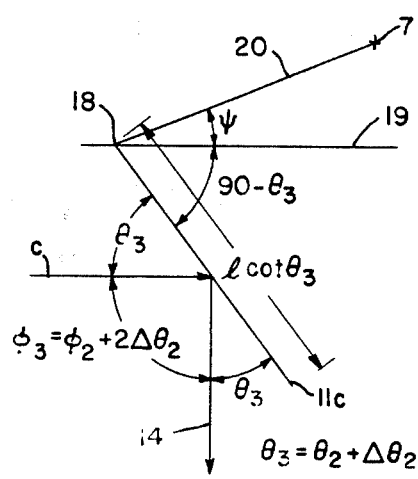

Referring to FIG. 4c, the reflective surface 11c is shown in the third position making an angle with optical path 14 equal to $\theta_3$, where $\theta_3 = \theta_2 + \Delta\theta_2$ and $\phi_3 = \phi_2 + 2\Delta\theta_2$. Similarly, in FIG. 4d, ray d and optical path 14 form an angle $\theta_4$ relative to reflective surface 11d where $\theta_4 = \theta_3 + \Delta\theta_3$ and $\phi_4 = \phi_3 + 2\Delta\theta_3$.

Finally, in FIG. 4e reflective surface 11e is positioned so that ray e and optical path 14 form an angle $\theta_5$ relative to reflective surface 11e where $\theta_5 = \theta_4 + \Delta\theta_4$ and $\phi_5 = \phi_4 + 2\Delta\theta_4$, where $\phi_5 = 180° - 2\theta_5$.

In the preferred embodiment shown in FIG. 3, $\Delta\theta_1 = \Delta\theta_2 = \Delta\theta_3 = \Delta\theta_4$. However, it will be appreciated that the present invention in its more general application is not so limited and $\Delta\theta_1$ through $\Delta\theta_4$ may each be different. Further, it will be appreciated that the minimum number of reflective surfaces required to completely interrogate a defined field of view is equal to the field of view to be searched divided by the field of view of the detector means in that plane rounded to the next integer value.

Finally, in positioning the respective reflective surfaces on the circumference of drum 10 so that optical energy from the environment is reflected into the entire field of view of the detector means 4, it is necessary to increase the length of each reflective surface as shown in the plane of the paper of FIG. 3 (or the width of each surface as shown in FIG. 2) as the angle $\theta_i$ changes. The relative lengths of the respective reflective surfaces may be approximated in relation to the effective surface length or diameter of the first focusing lens of detector means 4 which focuses optical energy on a detector surface in detector means 4. If that length is defined as l, then the length of reflective surface 11a may be approximated as $l\cot\theta_1$ as illustrated in FIG. 4a. Similarly, the length of reflective surfaces 11b, 11c, 11d, and 11e may be approximated as $l\cot\theta_2$, $l\cot\theta_3$, $l\cot\theta_4$, and $l\cot\theta_5$, respectively as illustrated in FIGS. 4b–4e, respectively. It will be appreciated, however, that such lengths are approximate because the various optical components of detector means 4 may cause the optical energy reflected from the various reflective surfaces to not be exactly collimated, i.e., parallel to optical path 14.

It will be further appreciated that the optical energy referred to throughout may be of any frequency spectrum and that detector means 4 may be chosen to detect optical energy from the visible spectrum or from the infra-red spectrum or any other optical energy spectrum.

While the apparatus illustrated in FIGS. 1–3 represents a preferred embodiment of the present invention, it will be obvious to those skilled in the art that changes and modifications may be made without departing from the invention in its broader aspects and therefore the aim of the appended claims is to cover all such changes and modifications as fall within the true spirit and scope of the invention.

What is claimed is:

1. A system for resolving the presence of an object in a field of view by sequentially staring at portions of the field of view during operative mode of the system, comprising the combination:

a drum having a plurality of reflective members substantially equally spaced about its outer periphery and attached to said outer periphery;

means, coupled to said drum, for intermittently starting and stopping rotation of said drum and consequently said reflective members in discrete steps thereby enabling said reflective members to sequentially stare at portions of a first field of view during said operative mode; and a unit detector, fixedly positioned within the system external said drum and optically intermittently coupled to each of the reflective members in said discrete steps during said operative mode, said detector having a second field of view substantially smaller than the first field of view.

2. The invention as stated in claim 1, wherein said reflective members are positioned on said drum at different angles with respect to each other.

3. The invention as stated in claim 1, wherein said reflective members are positioned on said drum at successively increased angular orientations with respect to each other.

4. The invention as stated in claim 1, wherein said detector is capable of detecting a modulated signal provided by said object within each of the portions of the first field of view.

5. The invention as stated in claim 1, wherein said detector senses infrared signals.

6. The invention as stated in claim 1, wherein said detector senses collimated light.

7. The invention as stated in claim 1, wherein said detector senses light signals.

8. A method for providing a total field of view in discrete segments so as to observe an object comprising the steps of:

(a) discretely starting and stopping rotation of a drum having a plurality of mirrors thereon, in sequence, so that each of said mirrors stares at a portion of the total field of view for a predetermined time duration;

(b) reflecting each stared portion on to a comparatively narrow field of view detector; and (c) detecting the reflected portions of the total field of view in said sequence.

9. The method as stated in claim 8, including the further step of:

(d) resolving the detected portions of the field of view.

10. The method as stated in claim 8, wherein step (c) detects modulated signal sources within each of the portions of the detected field of view when said modulated signal sources are present within each of said portions.

11. The method as stated in claim 8, wherein collimated light is detected during step (c).

12. The method as stated in claim 8, wherein infrared signals are detected during step (c).

13. The method as stated in claim 8, wherein optical signals are detected during step (c).

14. Apparatus for searching a given field of view and for detecting a modulated optical signal located therein, comprising, in combination:

a drum;

said drum being adapted for rotation about an axis;

said drum having plurality of reflective members substantially equally spaced about its outer periphery and attached thereto;

means coupled to said drum for imparting an intermittent rotary motion to said drum and for stopping rotation of said drum and said reflective members in discrete steps thereby enabling said reflective members to sequentially stare at successive portions of said given field of view; and a detector mounted within said apparatus external to said drum and optically intermittently coupled to each of the reflective members in said sequence, said detector having a second field of view substantially smaller than said given field of view.

15. The apparatus as stated in claim 14, wherein said successive portions of the given field of view is in space environment.

* * * * *